United States Patent Office 3,399,975
Patented Sept. 3, 1968

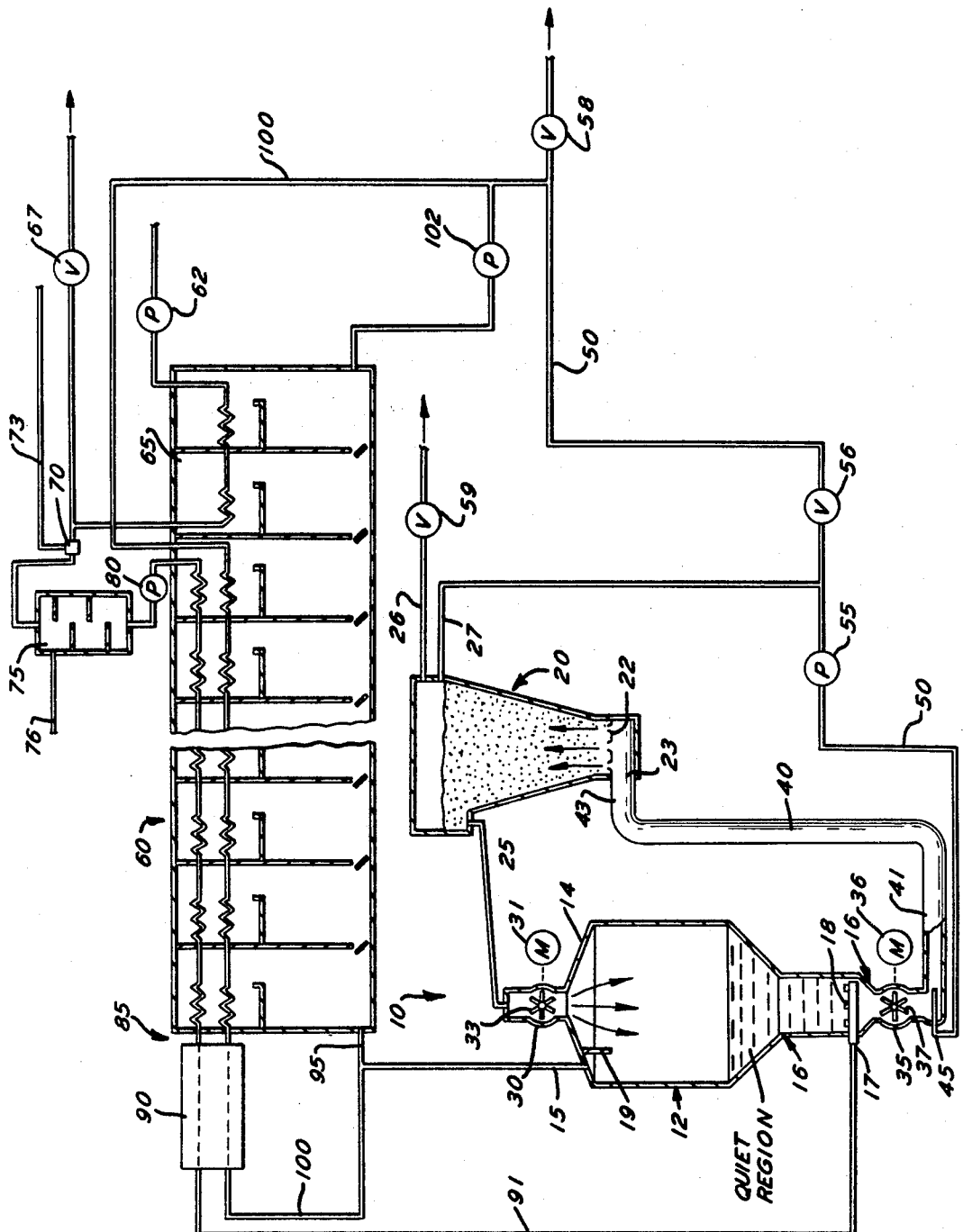

3,399,975
PRECIPITATION OF CaSO₄ ON INERT PARTICLES WITH COLD WATER WASH
Philip S. Otten, Media, Pa., assignor, by mesne assignments, to Baldwin-Lima-Hamilton Corporation, Philadelphia, Pa., a corporation of Delaware
Filed Apr. 12, 1965, Ser. No. 447,227
14 Claims. (Cl. 23—301)

This invention relates to sea water distillation and in particular to a simplified and economic removal of scale forming constituents in sea water.

A process is described in Patent No. 3,119,752, issued to A. Checkovich, for removing scale forming alkalinity by an acidification using sulfuric acid to form calcium sulfate. Since calcium sulfate is less soluble in hot sea water than in cold sea water, the anhydrite will precipitate out at a high temperature in relation to the concentration of the brine. After deaeration and decarbonation, it is practical to heat the sulfuric acidified sea water to temperatures as high as 300° F. and form a supersaturated solution of anhydrous calcium sulfate. An addition of seed crystals to the solution will cause a precipitation of the anhydrite on the seed crystals which can be removed by various solid-liquid separation techniques. However, it has not always been easy to separate the seed crystals and precipitant thereon from the solution by the simple means of a settling tank, as the shape and density of the seed crystal tends toward slow separation.

I propose, therefore, to form the seed crystals of a heavier, high gravity means, such as a small diameter shot, to add weight to the crystal. The proper selection of material size and shape of the precipitating body on which the precipitate is formed will provide settling characteristics which can be controlled to provide a compact and economical separation system.

Therefore, to overcome the foregoing and other difficulties of the prior art, a general object of this invention is to provide a new and improved means for removal of the scaling characteristics from salt water.

It is an object of this invention to improve the settling characteristics of a seed crystal carrying an anhydrite precipitate thereon.

Another object of this invention is to provide a compact and economical system for precipitation of anhydrite in salt water and easy separation and removal thereof.

A further object of this invention is to provide an improved apparatus wherein seed crystals may be washed of precipitate and recirculated to remove scaling characteristics of more sea water.

A further object is to provide a seed crystal circulating apparatus for use in conjunction with a multistage distilling plant wherein a brine stream from a cold stage is used to wash and recirculate the seed crystals.

Other objects will appear hereinafter.

For the purpose of illustrating the invention there is shown in the drawings a form which is presently preferred; it being understood, however, that this invention is not limited to the precise arrangements and instrumentalities shown.

Other objects and a fuller understanding of the invention may be had by referring to the following description and claims, taken in conjunction with the accompanying drawing, in which:

FIGURE 1 is a schematic representation of the apparatus in conjunction with a multistage flash distillation plant.

Referring to the drawing in detail, there is shown a representation of a scale-removing apparatus of the present invention designated generally as 10. A vessel 12 is provided of sufficient size to told a desired quantity of hot sea water therein. The vessel 12 has a conically-shaped top 14 with an outlet tubing 15 extending therefrom. The bottom 16 of the vessel 12 is funnel-shaped as illustrated. The bottom 16 has an inlet conduit 17 including the upwardly directed nozzles 18.

The reservoir 20 contains seed crystals which are formed on a core of small diameter metallic shot which has been coated by a desired crust of anhydrite. Naturally, it is understood, that the seed crystals need not of necessity have a metallic core; however, it may as an alternative be any heavy properly shaped seed crystal. "Heavy" or "high gravity" as used herein distinguish materials such as iron (Sp. Gr. 7.84), for example, from lighter materials such as the calcium sulfate (Sp. Gr. 2.3–2.9 in its various forms). Other materials such as stone, glass and some plastics may be considered "heavy" or "high gravity." An inlet 23 is provided at the bottom of the reservoir 20 for admission of seed crystals together with a cold brine flow therethrough. An open grid 22 above inlet 23 aids in containing the seed crystals from returning back through the inlet opening 23. As schematically illustrated in the drawing, the reservoir 20 has a portion above the vessel 12 so that seed crystals may be fed by gravity through a passageway 25 communicating with the top 14 of the vessel 12.

Means for admitting and scattering the seed crystals across the top of vessel 12 are shown generally at 30. Motor 31 activates a mixer blade 33 at the conical top 14 to admit and scatter the seed crystals in a manner indicated by the arrows. A baffle plate 19 prevents the seed crystals from entering and obstructing the outlet conduit 15. It is apparent that other means are available for admission and scattering of the seed crystals, such as by spreading across an open gridwork. Therefore, it is understood, that the schematic representation shown is only one of a variety of means.

Means for collecting the seed crystals at the bottom of the vessel 12 are shown generally at 35. There the motor 36 turns the impeller blade 37 for removal of all seed crystals collected at the end of the funnel-shape 16. It is again understood that this is a schematic representation and that other means are available.

A jet-lift tube 40 is provided to communicate between the collection means 35 and the inlet 23 of the reservoir 20. As illustrated in the drawing, the tube 40 has a Z-shape with horizontal members 41, 42 open at the collecting means 35 and inlet 23 respectively. The cold brine inlet conduit 45 is provided in the horizontal member 41 at a position below the collecting means 35.

A multistage flash distillation plant is shown generally at 60. A source of sea water is provided to the plant 60 by intake pump 62. The incoming sea water absorbs the heat in the heat rejection stage 65 and the major portion of the sea water is returned to the source through the heat rejection valve 67.

A portion of the sea water continues on through the plant and is treated by means of a nozzle 70 to acidify the salt water with sulfuric acid. The acid is supplied through a supply conduit 73. Entrained gases are removed from the acidified sea water in the deaeration chamber 75 through the vacuum conduit 76. A stream of treated sea water is provided through the remaining heat regenerative sections of the plant 60 by means of pump 40.

An external heater 90 is provided at the hot end 85 of the plant 60 as shown. The treated sea water is heated to a high temperature of approximately 300° F. and passed through the feed conduit 91 to the inlet of vessel 12 where the scaling characteristics are removed in a manner described hereinafter. The hot descaled sea water flows through outlet conduit 15 into the inlet 95 of the first stage of plant 60. The sea water is flashed and cascaded through the plant 60 from stage to stage in a normal manner. The remaining brine concentrate is cooled in the heat rejection stage 65 and removed by means of a pump 102. A portion of the brine concentrated is recirculated through the plant 60 by means of a conduit 100. Another portion of the brine concentrate is recirculated through conduit 50 and valve 56 to the inlet 45. The remainder of brine concentrate is discharged through valve 58 to waste. The pump 55 provides the desired flow through a circuit provided by conduit 50, jet flow tube 40, reservoir 20 and return brine conduit 27. A portion of the circulating cold brine is discharged through outlet conduit 26 and valve 59 to waste.

During operation of the scale removing apparatus 10 seed crystals are introduced into the vessel 12 to rain down through hot sea water therein in the direction of the arrows. Hot sea water enters the vessel 12 through the inlet 17 passing upward through nozzles 18 at a rate permitting calcium sulfate to deposit to practical equilibrium (95%–99%) on the falling seed crystals. The effluent hot brine is passed upward through conduit 15 into the distilling plant 60 as described before. All seed crystals settle and collect in a "quiet region" at the funnel shape 16, as shown. The seed crystals having a precipitate of calcium sulfate formed thereon are continuously collected and removed from the bottom of the vessel 12 by a means 35. A jet of brine concentrate from the heat rejection stage 65 of the multistage plant 60 is introduced through the cold brine inlet 45. The brine concentrate is relatively cold, at approximately 90° F., and unsaturated in relation to calcium sulfate which has been previously removed. The stream flow created by the pump 55 is of sufficient strength to lift the seed crystals and precipitate thereon and carry the same upward through jet tube 40 to the opening 23 of the reservoir 20. The flow continues in the direction of the arrows carrying the seed crystals upward into the reservoir 20. The open grid 22 helps to contain the fluidized seed crystals within the reservoir 20. Since the calcium sulfate precipitate is soluble in the unsaturated cold brine stream the seed crystals in reservoir 20 will be washed of excess precipitate and ready for recirculation back into the vessel 12. The cold brine concentrate at the top of reservoir 20, now saturated with calcium sulfate, will be removed, a portion through outlet conduit 26 in valve 59 to discharge, and a remaining portion recirculated through outlet conduit 27. The rate of recirculation of the seed crystals may be controlled by the admitting means 30 and collecting means 35. The rate of flow of the cold brine stream is controlled by pump 55. The proper adjustment of these controls will expose the crystals loaded with precipitate for a time at a flow rate sufficient to remove only the excess precipitate, leaving a sufficient crust of anhydrite on the core of the seed crystal satisfactory to facilitate ready adherence of new precipitate during recirculation.

The present invention may be embodied in other specific forms without departing from the spirit or essential attributes thereof and, accordingly, reference should be made to the appended claims, rather than to the foregoing specification as indicating the scope of the invention.

I claim:
1. A method of treating sea water to remove scaling characteristics thereof, comprising the steps of: heating said sea water to a temperature sufficient to form a solution supersaturated with anhydrous calcium sulfate; settling high gravity water insoluble seed particles through said solution for formation of an anhydrite precipitate thereon; collecting said seed particles and precipitate thereon for removal from said solution; providing water sufficiently cold to redissolve said precipitate; washing said seed particles in said cold water to redissolve said precipitate thereon; and recirculating said washed seed particles to remove the scaling characteristics of more sea water.

2. A method in accordance with claim 1 wherein said step of washing said seed particles to redissolve said precipitate thereon comprises passing said cold water upwardly through said seed particles and precipitate thereon to form a fluidized bed.

3. A method in accordance with claim 1 including the further step of acidifying said sea water with sulfuric acid prior to said heating step.

4. A method of treating sea water comprising the steps of: heating said sea water to a temperature sufficient to form a solution supersaturated with anhydrous calcium sulfate; settling high gravity water insoluble seed particles through said solution for formation of an anhydrite precipitate thereon; collecting said seed particles and precipitate thereon and removing said seed particles and precipitate thereon from said sea water; distilling said sea water in a multistage apparatus to provide a distillate and concentrated brine, washing said seed particles in water sufficiently cool to redissolve said precipitate thereon, said last-mentioned step being performed by forming a stream of cool water from a stage of the apparatus and placing said seed particles and precipitate thereon in said stream; and recirculating said washed seed particles.

5. A method in accordance with claim 4 wherein said stream is passed upwardly through said seed particles and precipitate thereon to form a fluidized bed.

6. A multistage distillation plant comprising a plurality of stages of successively lower temperature and pressure, a heater coupled to a front end of said plant for raising sea water to a temperature sufficient to form a solution supersaturated with anhydrous calcium sulfate, a vessel having an inlet communicating with said heater and an outlet communicating with a stage at the hot end of said plant, said solution flowing through said vessel to said plant, a reservoir of high gravity seed particles in communication with said vessel, an inlet for admitting said seed particles into the top of said vessel to rain down through said solution therein, thereby forming an anhydrite precipitate on said seed particles, means below said inlet for collecting said seed particles and precipitate thereon for removal from said vessel, said collecting means being in fluid communication with said reservoir, and a conduit in communication with said reservoir and a stage of said plant having brine therein sufficiently cool to redissolve said precipitate so that the brine washes said seed particles by redissolving at least a portion of the precipitate thereon, thereby enabling said particles to be recirculated.

7. A multistage distillation plant in accordance with claim 6 and means in said reservoir for forming a fluidized bed of said seed particles in said cool brine.

8. An apparatus in accordance with claim 6 wherein said seed particles comprise a core of metallic shot coated by a crust of anhydrite, said apparatus including means to control rate of flow of said brine and the rate of said seed crystal recirculation whereby excess of said precipitate is removed while said seed particles remain intact.

9. An apparatus for removal of scaling characteristics from sea water, comprising: means for heating said sea water to a high, scale-forming temperature; a vessel having an inlet and an outlet for said heated sea water; a reservoir of high gravity and streamlined seed particles, said reservoir being in communication with said vessel; means for admitting said seed particles at an upper portion of said vessel to settle therein through said heated sea water and form an anhydrite precipitate thereon; and means to remove said seed particles and precipitate thereon from said vessel; a conduit in communication with said removal means and said reservoir for transporting said seed particles and said precipitate thereon to said reservoir; and a source of water sufficiently cold to redissolve said precipitate in communication with said reservoir so that said water removes said precipitate from said particles in said reservoir.

10. An apparatus in accordance with claim 9 wherein said vessel has a funnel-shaped bottom for collection and guidance of said seed crystals to said removal means.

11. An apparatus for removal of scaling characteristics from sea water in conjunction with a multistage distillation plant, comprising: an external heater at a hot end of said plant raising said sea water to a high temperature forming a solution supersaturated with anhydrous calcium sulfate; a vessel having a bottom with an inlet communicating with said heater and having a top with an outlet communicating with a stage at said hot end of said plant, said solution flowing through said vessel to said plant; a reservoir of high gravity and streamlined seed particles above said vessel, said reservoir in communication with said vessel at said top; means for admitting said seed particles into said vessel by scattering said seed particles across said top to rain down through said solution therein and form an anhydrite precipitate thereon; means at said bottom below said inlet to collect said seed particles and precipitate thereon for removal from said vessel; a tube communicating between said reservoir and collecting means; and means for admitting a brine stream from a heat rejecting stage of said plant into said tube and flowing to said reservoir and carrying said seed particles therealong, said precipitate being soluble in said cold brine enabling said seed particles to be washed so that at least a portion of the said precipitate may be removed, and said seed recirculated to remove said scaling characteristics of more sea water.

12. An apparatus in accordance with claim 11 wherein said seed particles comprise a core of metallic shot coated by a crust of anhydrite, said apparatus including means to control the rate of said cold brine stream flow and rate of said seed particle recirculation whereby excess of said precipitate is removed while said seed particles remain intact.

13. An apparatus in accordance with claim 12 wherein said vessel has a funnel-shaped bottom for guidance of said seed particles to said collecting means.

14. An apparatus in accordance with claim 11 wherein said tube is a jet-lift tube having a Z-configuration with horizontal members open to said collecting means and reservoir, respectively.

References Cited

UNITED STATES PATENTS

| | | | |
|---|---|---|---|
| 1,399,845 | 12/1921 | Bull | 210—57 |
| 2,856,074 | 10/1958 | Dubitzky | 203—10 |
| 2,979,442 | 4/1961 | Baoger | 203—10 |
| 3,026,261 | 3/1962 | Mayfield | 203—10 |
| 3,160,585 | 12/1964 | Emmett | 203—7 |

OTHER REFERENCES

Technical Review, "Falling Film Evaporator Process," by Struthers Scientific and International Corporation (pages 6 and 7, "Scale Prevention"), March 1965.

Thermodynamic Properties of Saline Water by Office of Saline Water, Research and Development Progress Report No. 104, October 1964, Table 6, page 65.

NORMAN YUDKOFF, *Primary Examiner.*

G. P. HINES, *Assistant Examiner.*